United States Patent [19]

Abe et al.

[11] Patent Number: 5,199,523

[45] Date of Patent: Apr. 6, 1993

[54] FRONT AND REAR WHEEL STEERING SYSTEM FOR A VEHICLE

[75] Inventors: Masaru Abe; Yoshimichi Kawamoto; Norio Ukai; Takashi Kohata, all of Saitama, Japan

[73] Assignee: Honda Giken Kogyo Kabushiki Kaisha, Tokyo, Japan

[21] Appl. No.: 369,085

[22] Filed: Jun. 20, 1989

[30] Foreign Application Priority Data

Jun. 23, 1988 [JP] Japan .................. 63-155958

[51] Int. Cl.⁵ .................. B62D 5/00; B62D 5/02; B62D 5/06
[52] U.S. Cl. .................. 180/140; 280/91
[58] Field of Search .................. 180/140; 280/91

[56] References Cited

U.S. PATENT DOCUMENTS

| | | | |
|---|---|---|---|
| 4,572,316 | 2/1986 | Kanazawa et al. | 280/91 |
| 4,691,932 | 9/1987 | Hyodo | 280/91 |
| 4,705,135 | 11/1987 | Kawamoto et al. | 280/91 |
| 4,782,907 | 11/1988 | Morishita et al. | 180/140 |
| 4,792,007 | 12/1988 | Abe et al. | 180/140 |
| 4,881,613 | 11/1989 | Kanazawa et al. | 180/140 |

*Primary Examiner*—Mitchell J. Hill

*Attorney, Agent, or Firm*—Irving M. Weiner; Joseph P. Carrier; Pamela S. Burt

[57] ABSTRACT

A front and rear wheel steering system for a vehicle which transmits a steering input from a front wheel steering gear box to a rear wheel steering gear box via a coupling shaft as a rotation thereof around its longitudinal line and varies a steering gear ratio of rear wheels to front wheels according to the speed of the vehicle. A steering rod for steering the rear wheels with its longitudinal movement is provided with a crank portion which is engaged with a swing shaft pivotally attached to the coupling shaft via a pivot shaft perpendicular thereto so as to perform a gyrating motion around an extension line of the coupling shaft and thereby move the steering rod along its longitudinal direction to achieve a steering action of the rear wheels. The steering rod can be rotated around its longitudinal line according to the vehicle speed so as to displace the crank portion relative to the extension line of the coupling shaft and change the relationship between the rotational angle of the coupling shaft or the steering input to the front wheel steering gear box and the longitudinal movement of the steering rod or the steering angle of the rear wheels.

12 Claims, 7 Drawing Sheets

FRONT AND REAR WHEEL STEERING SYSTEM FOR A VEHICLE

TECHNICAL FIELD

The present invention relates to a front and rear wheel steering system for a vehicle which steers rear wheels in relation with the steering of the front wheels.

BACKGROUND OF THE INVENTION

It is known that the handling of a vehicle can be improved by steering not only the front wheels but also the rear wheels according to the vehicle speed, in particularly by steering the rear wheels in an opposite phase relationship relative to the front wheels in low speed range and in a same phase relationship relative to the front wheels in high speed range.

U.S. Pat. No. 4,572,316 discloses a four-wheel steering system in which the rear wheels are actuated by a hydraulic cylinder. The hydraulic cylinder is in turn controlled by a valve which is controlled according to the steer angle of the front wheels and the vehicle speed. However, this prior art system has the disadvantage of the complexity of the control system. It is also a disadvantage that the rear wheels are steered by the hydraulic cylinder without any direct linkage between the steering wheel and the rear wheels. U.S. Pat. No. 4,705,135 discloses a four wheel steering system responsive to a vehicle speed in which a mechanical coupling is used between the steering wheel and the rear wheels. A motor driven mechanical actuator is provided for varying the steering angle ratio of the rear wheels to the front wheels as a continuous mathematical function of the vehicle speed. However, the mechanism for varying the steering angle ratio of the rear wheels to the front wheels is relatively complicated and large in size, and may not be suitable for certain practical applications where little space is available for such a mechanism.

BRIEF SUMMARY OF THE INVENTION

In view of such problems of the prior art, a primary object of the present invention is to provide a front and rear wheel steering system for a vehicle which can improve the handling of the vehicle at low speed and the driving response of the vehicle at high speed without complicating the system structure.

A second object of the present invention is to provide a speed responsive front and rear wheel steering system which is reliable in operation and economical to manufacture.

A third object of the present invention is to provide a speed responsive front and rear wheel steering system which can achieve a favorable steering angle ratio property by means of a mechanical structure and without unduly complicating the system.

A fourth object of the present invention is to provide a speed responsive front and rear wheel steering system which accounts for the magnitude of the steering input.

These and other objects of the present invention can be accomplished by providing a front and rear wheel steering system for a vehicle, comprising: a front wheel steering gear box having an input end coupled with a steering wheel, a first output end coupled with a steering linkage for a front wheel, and a second output end coupled with an end of a coupling shaft extending longitudinally of a vehicle body for transmitting a steering input from the steering wheel as a rotary movement of the coupling shaft about its longitudinal line; and a rear wheel steering gear box having an input end coupled with another end of the coupling shaft, and an output end coupled with a steering linkage for a rear wheel; wherein the rear wheel steering gear box comprises: a swing shaft pivotally coupled with the other end of the coupling shaft at its one end via a pivot shaft extending perpendicularly to the longitudinal line of the coupling shaft; a steering rod, for steering the rear wheel by longitudinal movement of the steering rod, extending laterally of the vehicle body and provided with a crank portion radially extending from the steering rod; guide means for guiding the steering rod for linear movement along its longitudinal line and rotary movement around its longitudinal line; joint means coupling a part of the swing shaft with the crank portion of the steering rod for transmitting a gyrating movement of the swing shaft around the longitudinal line of the coupling shaft to the steering rod as a longitudinal movement thereof; and control means for rotating the steering rod about its longitudinal line according to an output from a vehicle speed sensor.

Thus, by rotating the steering rod so as to vertically displace the point of engagement between the swing shaft and the crank portion of the steering rod, and gyrating the swing shaft around an extension line of the longitudinal line of the coupling shaft, the steering rod can be moved along the longitudinal direction thereof or, in other words, laterally of the vehicle body by the horizontal component of the gyrating movement of the swing shaft at the point of engagement between the swing shaft and the crank portion. Further, by changing the rotational position of the steering rod around its longitudinal line according to a vehicle speed, the longitudinal travel of the steering rod for a given steering input can be changed so as to control the steering angle ratio of the rear wheels to the front wheels as desired. Thus, the mechanical coupling of a steering input end with both the front and rear wheels can be accomplished with an extremely simple and compact structure. If the control means can rotate the steering rod over a range which includes positions of the swing shaft diametrically opposed with respect to a position of the swing shaft aligned with the coupling shaft, the possible range of the steering angle ratio can cover both the same phase relationship and the opposite phase relationship.

According to a preferred embodiment of the present invention, the joint means comprises a ball member received in a complementary spherical cavity provided in the crank portion, and a linear slide bearing provided coaxially in the ball member for guiding the swing shaft along its longitudinal direction.

In order to modify the steering angle ratio property of the system so as to account for the amplitude of the steering input, the joint means may comprise an eccentric shaft extending from the swing shaft in parallel therewith, first guide means provided in the crank portion for guiding the swing shaft along a lateral direction in parallel with the longitudinal line of the steering rod, a slider member including a ball member received in a complementary spherical cavity provided in the slider member, and a linear slide bearing provided coaxially in the ball member for guiding the eccentric shaft along its longitudinal direction, second guide means provided in the crank portion for guiding the slider member along a direction perpendicular to the lateral guiding direction of the first guide means.

To achieve a high level of reliability and to incorporate a fail safe feature to the system, the control means may comprise hydraulic cylinder means for rotating the steering rod, and a restoring spring for restoring the steering rod to a neutral position at which the swing shaft aligns with the coupling shaft.

BRIEF DESCRIPTION OF THE DRAWINGS

Now the present invention is described in the following in terms of specific embodiments thereof with reference to the appended drawings, in which.

DETAILED DESCRIPTION OF THE PREFERRED EMBODIMENTS

Figure 1:
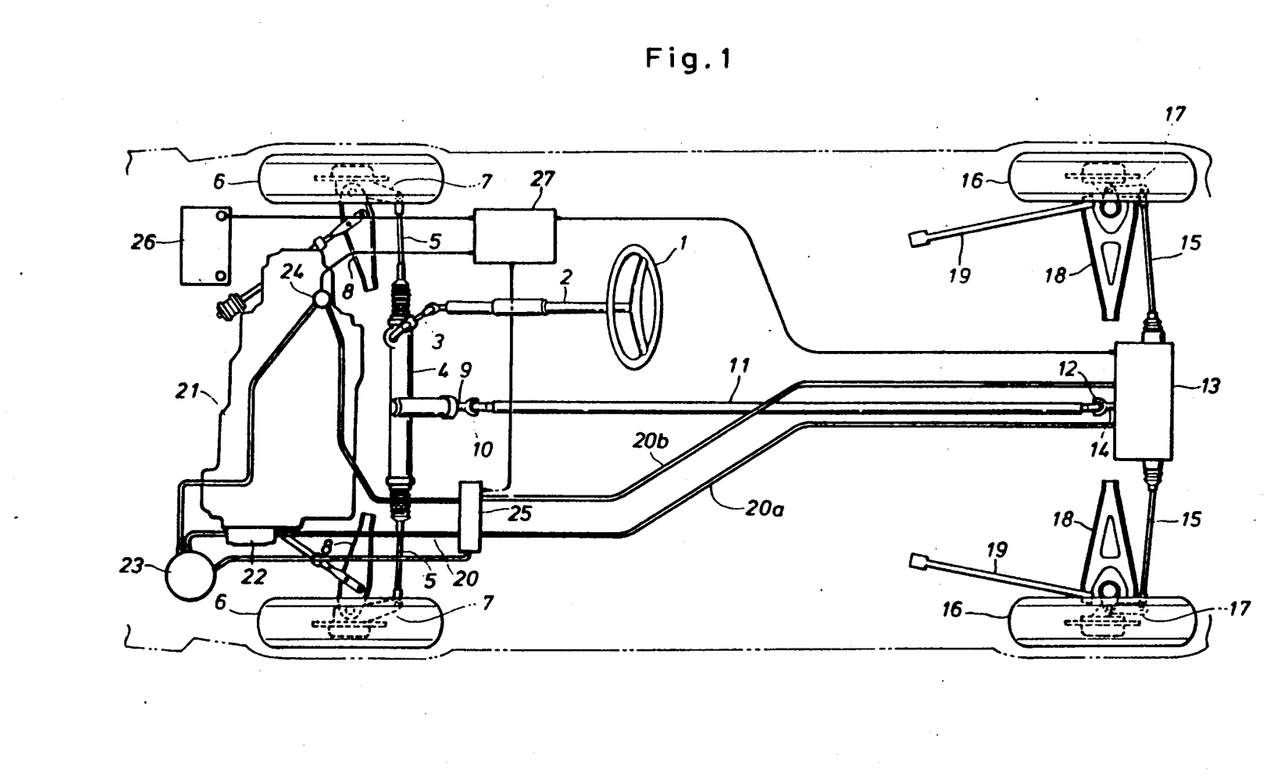
FIG. 1 is a plan view showing the overall structure of a first embodiment of the front and rear wheel steering device according to the present invention.

FIG. 1 generally shows the overall structure of a first embodiment of the front and rear wheel steering system for a vehicle according to the present invention. The steering shaft 2 of a steering wheel 1 is coupled with a rack and pinion type front steering gear box 4 via a steering joint 3 consisting of a pair of universal joints. The front steering gear box 4 is internally provided with a pinion and a rack meshing therewith, and tie rods 5 are connected to the lateral ends of the rack via ball joints. The external ends of the tie rods 5 are coupled with knuckle arm portions of knuckles 7 which carry front wheels 6 and can pivot laterally so that the right and left front wheels 6 may be steered according to the steering directions transmitted from the steering wheel 1. The knuckles 7 are supported by the vehicle body via lower arms 8 and front wheel suspension systems including shock absorbers.

A pinion shaft 9 extends rearwardly from the front steering gear box 4, and is coupled, at its rear end, with a coupling shaft 11 for transmitting a steering movement to the rear wheels via a universal joint 10. The rear end of the coupling shaft 11 is coupled with an input shaft 14 of a rear steering gear box 13 for steering the rear wheels, via another universal joint 12. The rear steering gear box 13 is internally provided with a steering rod which is disposed laterally so as to be moveable along its longitudinal direction as described hereinafter, and the lateral ends of the steering rod are connected to laterally extending tie rods 15, respectively, via ball joints. The external ends of the tie rods 15 are coupled with knuckle arm portions of knuckles 17 which carry the rear wheels 16, and the knuckles 17 are in turn supported by the vehicle body via lower arms 18, shock absorbers, and radius rods 19.

Meanwhile, the rear steering gear box 13 is internally provided with a hydraulic cylinder which is described hereinafter, and the hydraulic cylinder is connected to an oil pump 22 driven by the engine 21 and to an oil tank 23 via conduits 20. The conduits 20 are also connected to a control device 25 which is in turn connected to a vehicle speed sensor 24 so that the working fluid pressurized by the oil pump 22 may be supplied to the rear steering gear box 13 according to the vehicle speed. The vehicle speed sensor 24 is controlled by an on-board computer 27 which is powered by an on-board battery 26, and the computer 27 is electrically connected to the control device 25.

Figure 2:
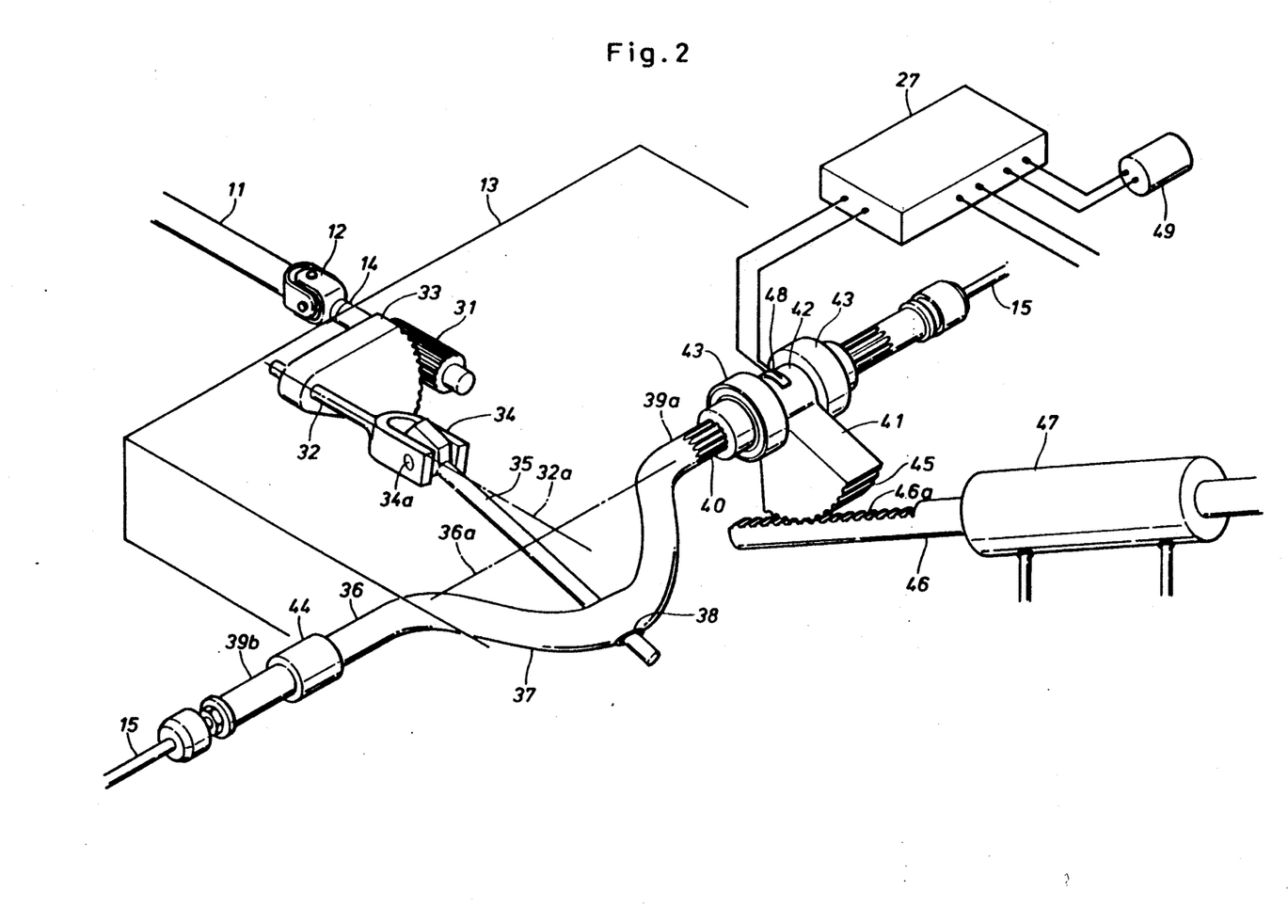
FIG. 2 is a simplified perspective view of the structure of the rear steering gear box of the first embodiment.

FIG. 2 shows the structure of the rear steering gear box 13 in greater detail. A pinion 31 is provided in the rear end of the input shaft 14, and the pinion 31 is meshed with a sector gear 33 mounted on an output shaft 32 which is disposed in parallel with the input shaft 14 for transmitting the rotation of the coupling shaft 11 to the output shaft 32 at a reduced ratio. To the rear end of the output shaft 32 is pivotally connected an end of a swing shaft 35 via a coupling 34 including a pivot shaft 34a extending perpendicularly to the output shaft 32 so as to be able to swing vertically in the neutral state of the coupling shaft 11.

The steering rod 36 is disposed horizontally and laterally of the vehicle body so that its longitudinal line 36a extends perpendicularly to the longitudinal line 32a of the output shaft 32. A central part of the steering rod 36 situated between a pair of stem portions 39a and 39b is curved into a crank portion 37. The central part of the crank portion 37 which is most remote from the longitudinal line 36a is provided with a coupling portion 38 consisting of, for instance, a spherical slide bearing which comprises a ball member received in a complementary spherical cavity provided in the crank portion 37, and a linear slide bearing provided coaxially in the ball member for guiding the swing shaft 35 along its longitudinal direction. The coupling portion 38 thus constrains the swing shaft 35 in vertical and lateral directions with respect to the crank portion 37 but allows the swing shaft 35 to slide longitudinally and to gyrate with respect to the steering rod 36.

One of the stem portions 39a of the steering rod 36 is provided with a spline 40 of a certain longitudinal length on in its outer circumferential surface, and a sector gear 41 is fitted onto the steering rod 36 via the spline 40 so that the sector gear 41 may move freely longitudinally but rotate integrally with respect to the steering rod 36. The steering rod 36 is supported by the rear steering gear box 13 so as to be laterally moveable and rotatable around its longitudinal line by means of a pair of bearings 43 mounted on the stem portion 42 of the sector gear 41 and another bearing 44 mounted on the other stem portion 39b of the steering rod 36. The length of the spline 40 is determined so as to have a sufficient length to accommodate the stroke of the longitudinal movement of the steering rod 36.

With the teeth 45 of the sector gear 41 mesh the teeth 46a of a rack 46. The rack 46 is longitudinally driven by the hydraulic cylinder 47 which is activated by pressurized oil supplied by the oil pump 22 from the oil tank 23 and via the conduits 20, and rotates the steering rod 36 via the sector gear 41. As a result of the rotation of the steering rod 36, the swing shaft swings 35 vertically around the coupling 34. A potentiometer 48 is provided in the stem portion 42 of the sector gear 41 for constantly detecting the rotational position of the steering rod 36 and supplies a position signal to the computer 27. The computer 27 is further connected to a vehicle speed meter 49.

Figure 3:
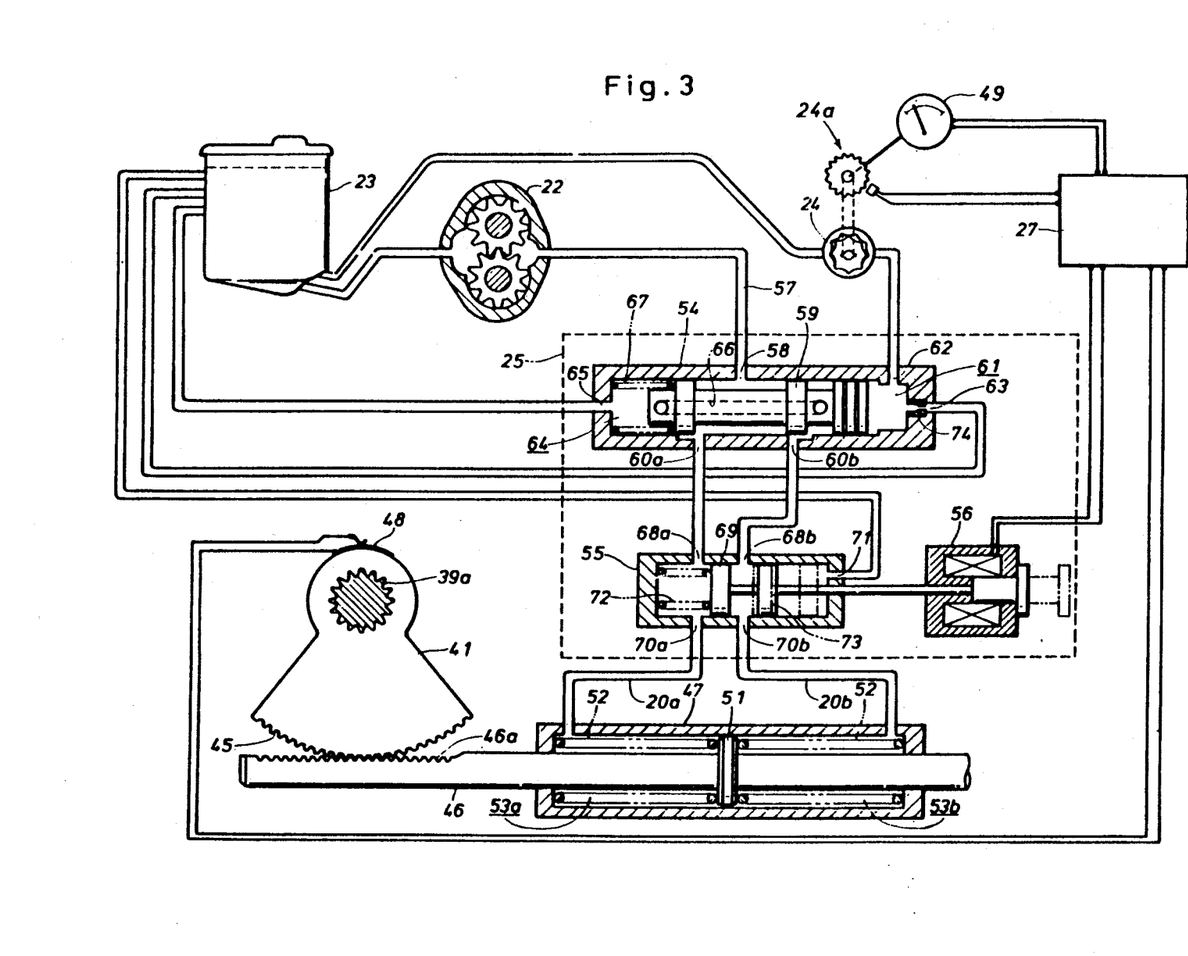
FIG. 3 is a diagram of the hydraulic circuit for driving the steering rod of the first embodiment.

FIG. 3 shows a diagram of the hydraulic circuit for driving the hydraulic cylinder 47. The hydraulic cylinder 47 consists of a double-rod, double-acting cylinder, and a piston 51 fixedly secured to the rack 46 is urged toward a neutral position from either lateral direction by a pair of springs 52 arranged in coaxial relationship. To a pair of pressure chambers 53a and 53b defined on either side of the piston 51 are connected conduits 20a and 20b, respectively, for selectively supplying the pressurized oil supplied from the oil pump 22 under the control of the control device 25.

The control device 25 is provided with a guide valve 54, a switching valve 55, and a solenoid 56 for actuating this switching valve 55. The guide valve 54 consists of a spring offset type, pilot actuated 4-port spool valve of a conventional type, and is provided with an inlet port 58 which is communicated with the oil pump 22 via a conduit 57 and a pair of ports 60a and 60b which are selectively communicated with the inlet port 58 according to the movement of a spool 59.

A pressure chamber 61 adjoining an end of the spool 59 is provided with a pilot port 62 connected to the vehicle speed sensor 24 and a return port 63 connected to the oil tank 23. The return port 63 is provided with an orifice 74 for restricting the flow of the hydraulic fluid directed toward the oil tank 23 so as to apply a pilot pressure to the spool 59. Another pressure chamber 64 adjoining the other end of the spool 59 is provided with a return port 65 connected to the oil tank 23, and is communicated with one of the cylinder ports 60b via a return passage 66 provided inside the spool 59. The spool 59 is normally urged to the right in the drawing by a spring 67 accommodated in the pressure chamber 64, and switches over the flow passage communicating with the inlet port 58 by being slid laterally by the pilot pressure acting in the pressure chamber 61. The cylinder ports 60a and 60b are connected to inlet ports 68a and 68b of the switching valve 55, respectively.

A spool 69 of the switching valve 55 is brought to the state shown in FIG. 3 where the inlet ports 68a and 68b are communicated with outlet ports 70a and 70b, respectively, which are in turn connected to the conduits 20a and 20b, respectively, in the energized state of the solenoid 56. Therefore, the hydraulic fluid selectively supplied by the guide valve 54 is introduced into the corresponding pressure chambers 53a and 53b, respectively, via the cylinder ports 60a and 60b and the conduits 20a and 20b. A drain port 71 of the switching valve 55 is connected to the oil tank 23.

Should any failure occur in the rear steering gear box 13 or in its control mechanism due to any abnormal situation, the solenoid 56 is deenergized by command from the computer 27, and the spool 69 is moved to the right to the position indicated by the imaginary line 73 under the biasing force of the spring 72. As a result, the two pressure chambers 53a and 53b of the hydraulic cylinder 47 are communicated with each other, and the rack 46 is restored to a neutral position by the biasing forces of the springs 52 so as to achieve the function of a fail safe mechanism.

According to the present embodiment, the oil pump 22 consists of an ordinary gear pump which is driven by the engine 21, and controls the flow rate and the pressure of the hydraulic fluid supplied from the oil tank 23 to the guide valve 54. The vehicle speed sensor 24 consists of a trochoid pump which supplies the hydraulic fluid from the oil tank 23 to the pressure chamber 61 of the guide valve 54 by a certain flow rate corresponding to the vehicle speed. A gear pulse generator is connected to the shaft of this oil pump for supplying a signal indicative of the rotational speed of the trochoid pump to the computer 27. The shaft of the trochoid pump also drives the vehicle speed meter 49 via a wire cable, and the meter's signal is also supplied to the computer 27 as discussed above.

As the vehicle speed is increased and the volume of the hydraulic fluid supplied to the pressure chamber 61 increases, the spool 59 is moved to the left in the drawing against the biasing force of the spring 67. As a result, the inlet port 58 is communicated with the cylinder port 60a as shown in FIG. 3, and the hydraulic fluid is supplied from the conduit 20a to the left pressure chamber 53a of the hydraulic cylinder 47 while the hydraulic fluid in the right pressure chamber 53b of the hydraulic cylinder 47 is vented through the conduit 20b, the ports 70b, 68b, 60b, the return passage 66 and the port 65 whereby the piston 51 is pressed rightwardly and the rack 46 is moved to the right in the drawing. On the other hand, as the vehicle speed decreases and the pilot pressure in the pressure chamber 61 decreases, the spool 59 is moved to the right in the drawing, and the inlet port 58 is communicated with the other cylinder port 60b to supply the hydraulic fluid to the right pressure chamber 53b of the hydraulic cylinder 47. In this case, the hydraulic fluid in the left pressure chamber 53a is vented through the conduit 20a, the ports 70a, 68a, 60a, and 65. As a result, the rack 46 is reversed or moved to the left in the drawing. In other words, the displacement of the rack 46 is determined by stroke of the spool 59 of the guide valve 54, and this stroke is proportional to the flow rate of the hydraulic fluid expelled from the vehicle speed sensor 24.

Figure 4:
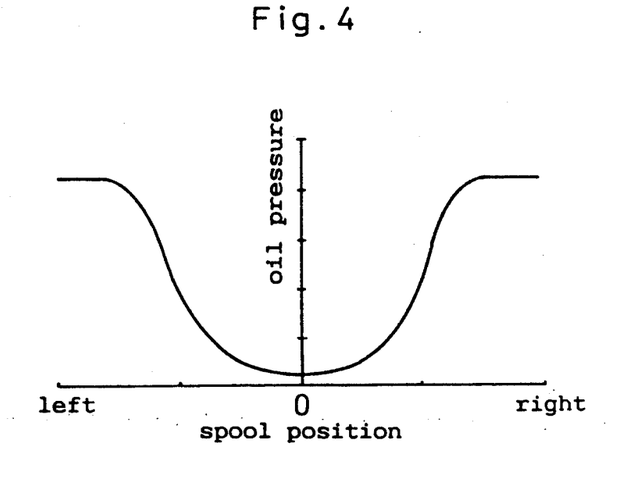
FIG. 4 is a graph showing the hydraulic pressure and spool stroke property of the guide valve.
Figure 5:
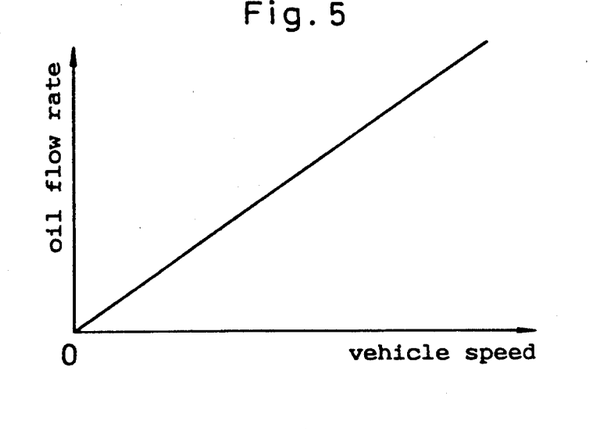
FIG. 5 is a graph showing the hydraulic fluid volume and vehicle speed property of the vehicle speed sensor.
Figure 6:
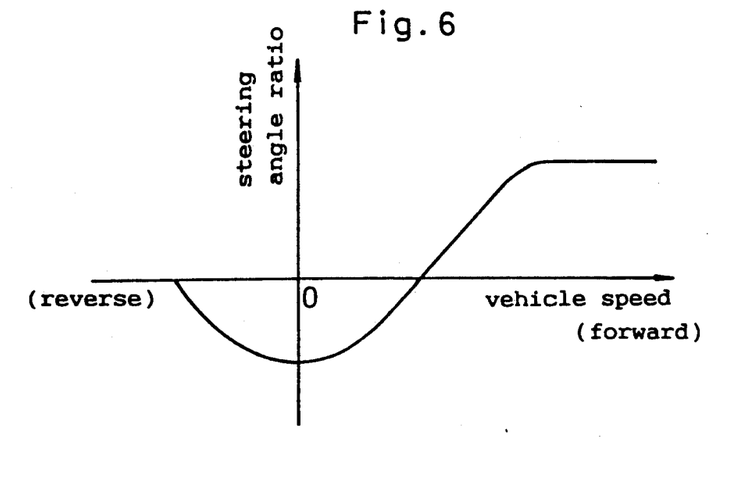
FIG. 6 is a graph of the vehicle speed and steering angle ratio property as a composition of FIGS. 4 and 5.

The 4-port valve used as the guide valve 54 is provided with a property shown in FIG. 4 regarding the relationship between the stroke of the movement of the spool 59 and the pilot pressure acting in the pressure chamber 61. Meanwhile, in regards to the vehicle speed sensor 24, there is a linear relation between the vehicle speed (rotational speed per minute) and the volume of the hydraulic fluid supplied to the pressure chamber 61 as shown in FIG. 5. Since the steering angle ratio between the front wheels and the rear wheels is determined by the rotational position of the steering rod 36 which is in turn determined by the stroke of the rack 46, the steering angle ratio is continuously controlled according to a certain mathematical function of a vehicle speed as shown in FIG. 6 which is given as a combination of the properties shown in FIGS. 4 and 5.

Now, the motion of the steering rod 36 is described in the following in relation with the rotational position of the steering rod 36 and the rotation of the coupling shaft 11 or the output shaft 32. In the state shown in FIG. 7, the swing shaft 35 has rotated the crank portion 37 downwardly by an angle $A_{st}$ around the longitudinal line 36a with respect to the horizontally and coaxially extended position of the output shaft 32, and the output shaft 32 is turned clockwise by an angle $A_{sw}$ while its inclination is kept fixed so as to move the steering rod 36 to the left in the drawing. Here, the distance between the rotational center A of the swing shaft 35 and the longitudinal line 36a of the steering rod 36 is d, and the distance between the longitudinal line 36a and the center of the coupling B between the coupling portion 38 and the swing shaft 35 or, in other words, the radius of rotation of the coupling portion 38 is r.

Figure 7:
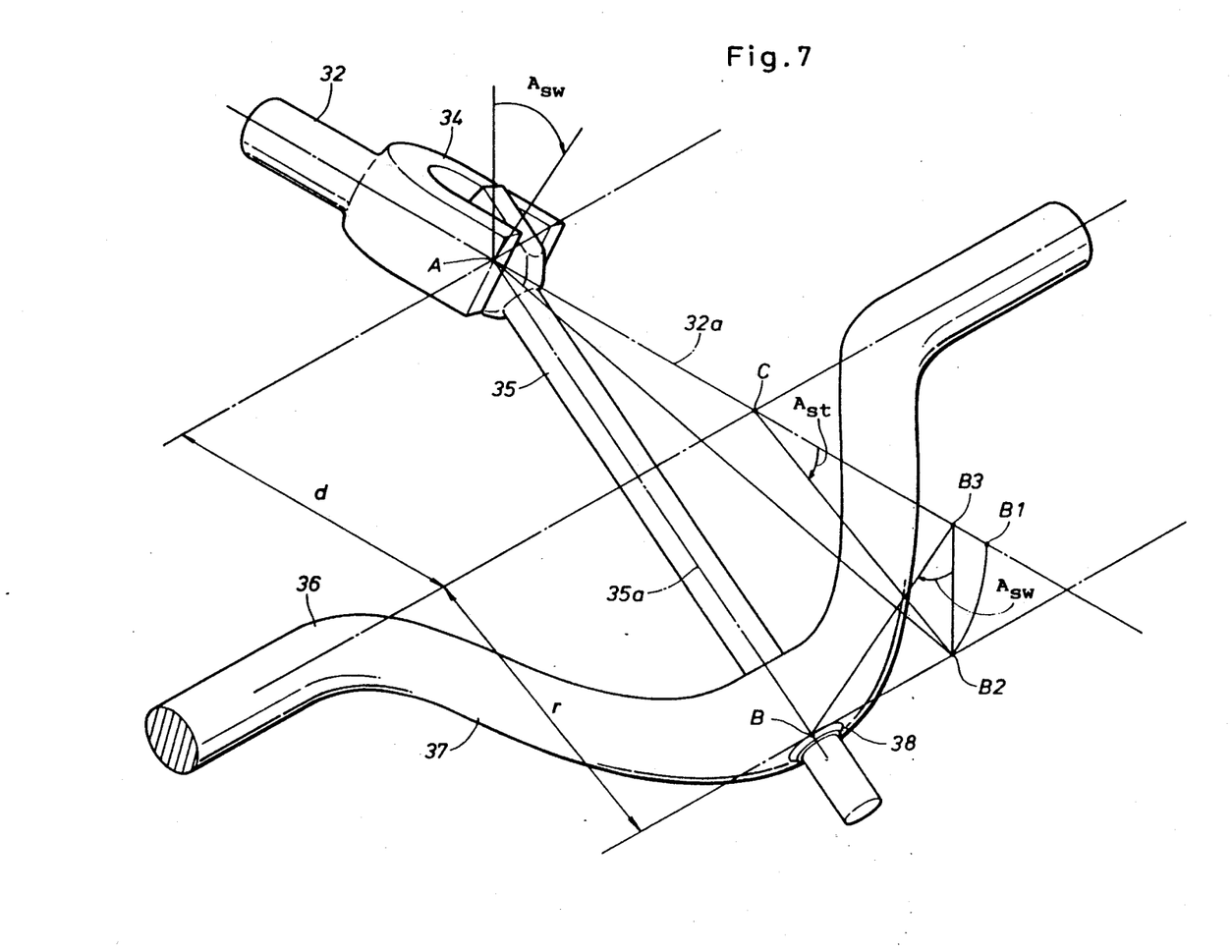
FIG. 7 is a schematic perspective view for showing the operation of the steering rod of the first embodiment.

The vertical travel of the coupling center B from the horizontal initial position B1 to the lower most position B2 due to the rotation of the steering rod 36 by the angle $A_{st}$ can be expressed as B2 B3=r sin $A_{st}$ where B3 is the intersection of the vertical line drawn from the point B2 to the longitudinal line 32a with the longitudinal line 32a. By turning the output shaft 32 by the angle $A_{sw}$, the crank portion 37 is moved leftwardly from the position B2 to the illustrated position while maintaining its angle of inclination $A_{st}$, and this lateral displacement can be expressed as B2 B=B2 B3 tan $A_{sw}$=r sin $A_{st}$ tan $A_{sw}$.

Figure 8:
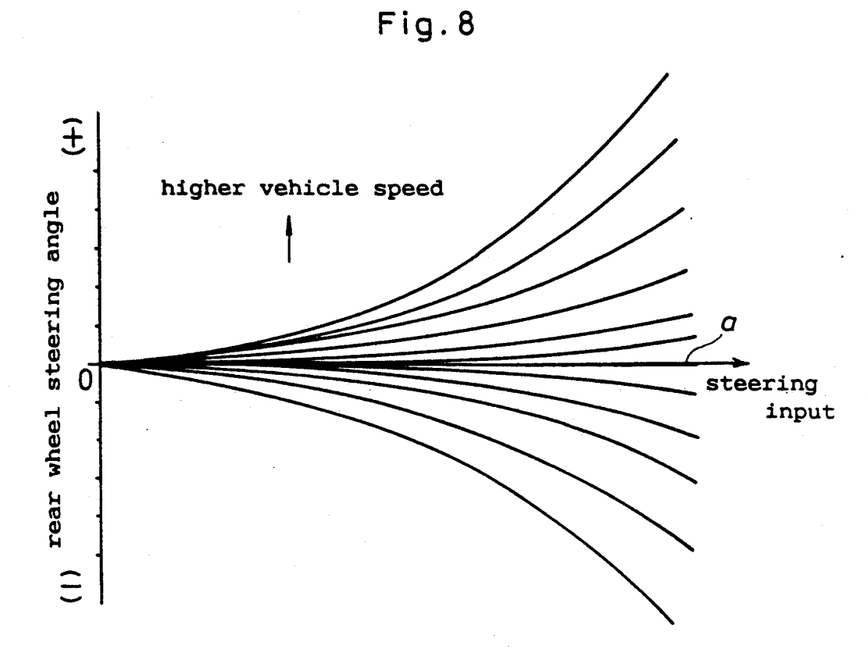
FIG. 8 is a graph showing the rear wheel steering ratio property of the embodiment shown in FIG. 7.

The stroke r sin $A_{st}$ tan $A_{sw}$ of the steering rod 36 determines the steering angle of the rear wheels. Therefore, the steering angle of the rear wheels for a given steering angle of the steering wheel can be expressed by a tangent curve with the angle $A_{st}$ fixed as shown in FIG. 8, and, if r is fixed, the larger the angle $A_{st}$ is, the sharper the tangent curve becomes and, accordingly, the larger the steering angle of the rear wheels becomes. Since the steering angle of the rear wheels changes as a tangent curve, a relatively large steering angle can be obtained particularly when the rear wheels are to be steered in opposite phase relationship with respect to the front wheels, and the minimum radius of turning of the vehicle can be reduced. Here, since the distance d does not affect the steering angle of the rear wheels, it can be selected from any desired value including zero. Also, when the aforementioned fail safe mechanism is activated, the rear wheels are not steered at all irrespective of the vehicle speed or the steering angle of the steering wheel as indicated by a in FIG. 8.

Figure 9:
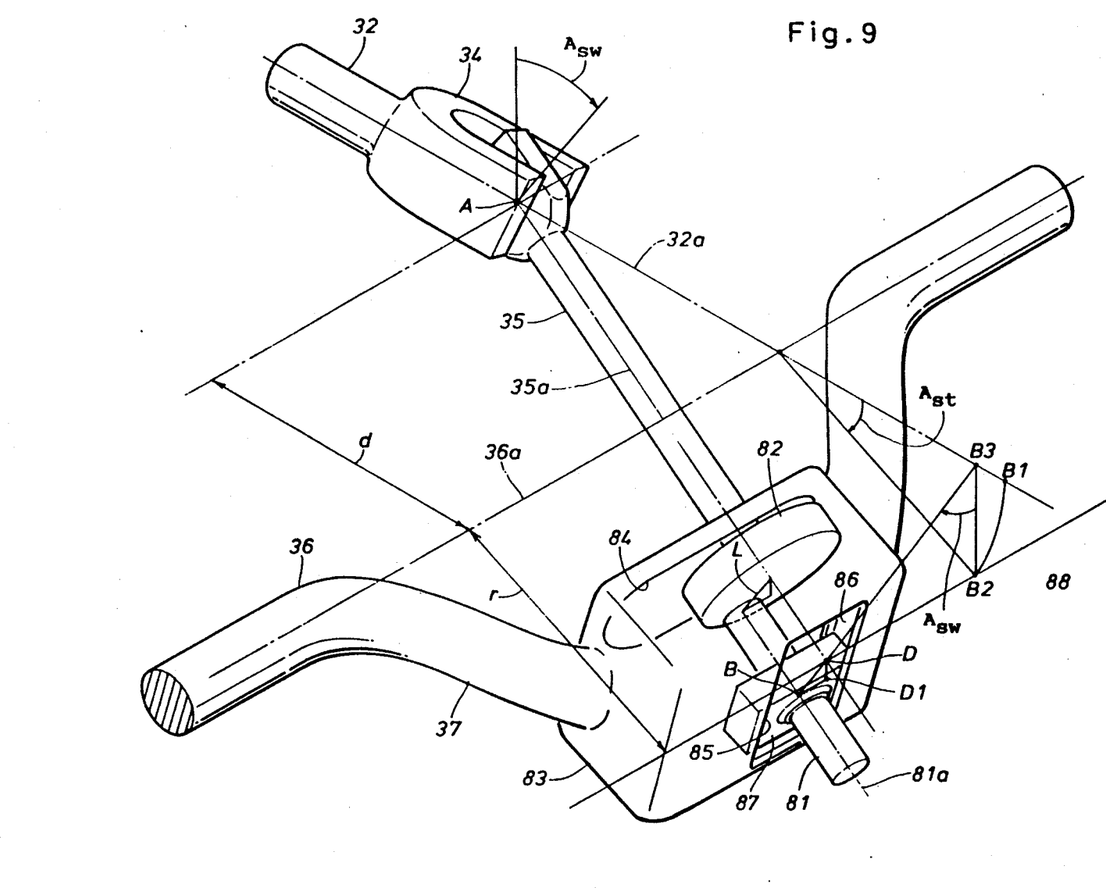
FIG. 9 is a schematic perspective view similar to FIG. 7, showing a second embodiment of the present invention.

FIG. 9 shows a second embodiment of the present invention.

In this second embodiment of the present invention, a disk crank 82 having an eccentric shaft 81 is integrally attached to the free end of the swing shaft 35. A box-shaped coupling portion 83 is provided in a substantially central part of the steering rod 36. The disk crank 82 is received in an opening 84 provided in a side surface of the coupling portion 83 facing the output shaft 32 so as to be laterally moveable relative thereto but constrained in the vertical direction. The other side surface of the coupling portion 83 facing away from the output shaft 32 is provided with an opening 85 extending vertically, and a slider 87 is received in this opening 85 so as to be slidable in the vertical direction along a guide 86. To a central part of the slider 87 is coupled the eccentric shaft 81 for instance via a spherical slide bearing or the like so as to able to slide along the longitudinal direction and gyrate around the longitudinal line, in the same way as the swing shaft 35 of the first embodiment.

The geometrical arrangement is determined so that, when the steering rod 36 is at its neutral position and the longitudinal line 35a of the swing shaft 35 coincides with the longitudinal line 32a of the output shaft 32, the longitudinal line 35a of the swing shaft 35 passes through a central point B of the coupling portion 83, and the eccentric shaft 81 is located at the lower most position of the disk crank 82 or, in other words, the slider 87 comes to its lower most position. When the steering rod 36 is rotated downwardly by an angle $A_{st}$ from this initial position, the central point B of the coupling portion 83 moves to the position B2 while the relative positions of the disk crank 82 and the eccentric shaft 81 are kept fixed as described above. Further, as the output shaft 32 is gyrated by an angle $A_{sw}$ in clockwise direction, the steering rod 36 is driven to the left in the drawing by being driven by the eccentric shaft 81 as the slider 87 moves upwardly guided by the guide 86. Here, the central point B of the coupling portion 83 moves along a trajectory which is parallel with the longitudinal line 36a.

FIG. 9 shows the state which has resulted from the above described movement in the same way as FIG. 7. To the displacement of the steering rod 36 is added the lateral displacement owing to the rotation of the eccentric shaft 81 since the disk crank 82 is vertically constrained in the coupling portion 83. In other words, the displacement is given by B2 D+D1 B where the center of coupling between the eccentric shaft 81 and the slider 87 is B, the intersection between the longitudinal line 35a of the sinking shaft 35 and the trajectory 88 is D, and the intersection between the plumb line passing through D and a line perpendicular to this plumb line and passing through B is D1. Here, it is assumed that the distance between the longitudinal line 36a and the trajectory or, in other words, the radius of rotation of the coupling portion 83 is r and that the eccentric distance of the eccentric shaft 81 is L. If the intersection between the longitudinal line 32a and a line drawn perpendicularly thereto from the position B2 is B3 as was the case with the first embodiment, since B2 B3=r sin $A_{st}$, one can obtain B2 D=r sin $A_{st}$ tan $A_{sw}$. Since the steering angle of the rear wheels is small and r is relatively small in value or since the inclination angle. DAB1 between the longitudinal line of the swing shaft 35 or the eccentric shaft 81 and the longitudinal line 32a of the output shaft 32 is relatively small, the distance D1 B may be approximated with L sin $A_{sw}$. Therefore, the total displacement of the steering rod 36 may be expressed by r sin $A_{st}$ tan $A_{sw}$+L sin $A_{sw}$.

Also, the rotational angle $A_{st}$ of the steering rod 36 and the swing angle of the swing shaft 36 disagree one another unless d=0, but, in order to retain the disk crank 82 in the opening 84 so as to be constrained in the vertical direction as described above, it suffices if the outer periphery of the disk crank 82 is circular so as to be always in sliding contact with the inner circumferential surface of the opening 84 or, alternatively, the disk crank 82 may be retained in the opening 84 by way of a spherical bearing or the like so as to be able to rotate and gyrate. Further, it is also possible to attain the same affect by connecting the disk crank 82 with the swing shaft 35 so as to allow a vertical swinging motion therebetween and mounting the coupling portion 83 receiving the disk crank 82 on the curved crank portion 37 in a relatively rotatable manner while maintaining the coupling portion 83 horizontally irrespective of the rotation of the steering rod.

Figure 10:
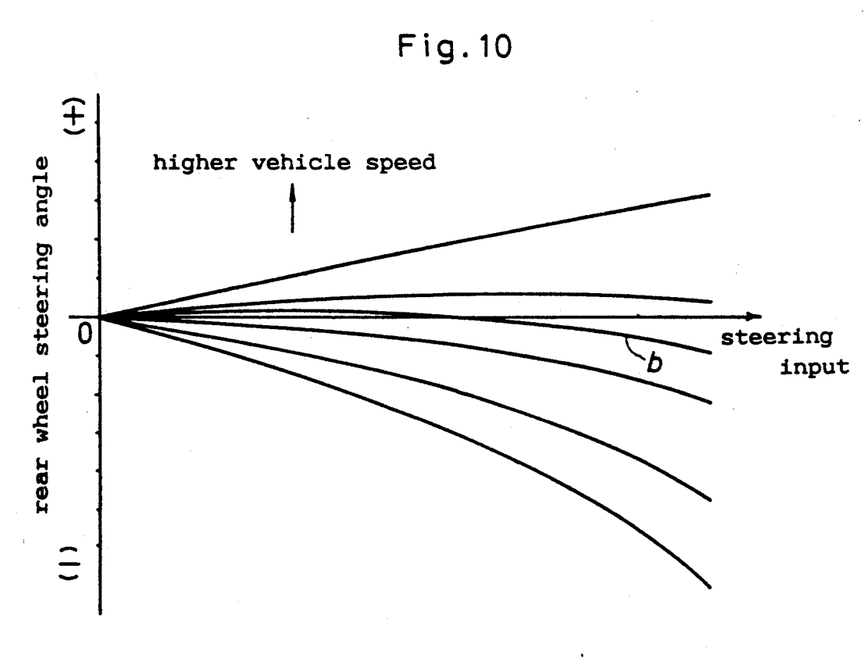
FIG. 10 is a graph similar to FIG. 8, showing the rear wheel steering ratio property of the embodiment illustrated in FIG. 9.

FIG. 10 shows the steering angle of the rear wheel in relation with the steering angle of the steering wheel for various fixed values of $A_{st}$ in the case of the second embodiment. According to this embodiment, the characteristic curve moves downwards for larger values of $A_{st}$, but, since a more favorable driving response and a high head turning capability for large steering angles can be obtained, a favorable driving response and handling can be achieved in both high and low speed ranges as compared with the first embodiment illustrated in FIG. 8. Also, when the fail safe mechanism is activated, as indicated by b in FIG. 10, the rear wheels are steered in the same phase relationship when the steering angle of the steering wheel is small and in the opposite phase relationship when the steering angle of the steering wheel is large, by small angles in both cases, irrespective of the vehicle speed.

Thus, according to the present invention, since the steering angle ratio of the rear wheels to the front wheels can be controlled according to a vehicle speed with a relatively simple structure in which a crank portion of a steering rod is connected to an output shaft via a swing shaft and the crank portion is selectively inclined by hydraulic means in a front and rear wheel steering device for a vehicle using mechanically coupled front and rear wheels, the driving response of the vehicle can be improved even further while maintaining the advantages of low cost and high reliability. In particular, when the swing shaft and the crank portion are mutually connected by a disk crank, a favorable steering response property can be obtained.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims, rather than the foregoing description.

What we claim is:

1. A front and rear wheel steering system for a vehicle, comprising: a front wheel steering gear box having an input end coupled with a steering wheel, a first output end coupled with a steering linkage for a front wheel, and a second output end coupled with an end of a coupling shaft extending longitudinally of a vehicle body for transmitting a steering input from said steering wheel as a rotary movement of said coupling shaft about its longitudinal line; and a rear wheel steering gear box having an input end coupled with another end of said coupling shaft, and an output end coupled with a steering linkage for a rear wheel; wherein said rear wheel steering gear box comprises:
    a swing shaft pivotally coupled with said other end of said coupling shaft at its one end via a pivot shaft extending perpendicularly to said longitudinal line of said coupling shaft;
    a steering rod, for steering said rear wheel by longitudinal movement of said steering rod, extending laterally of said vehicle body and provided with a crank portion radially extending from said steering rod;
    guide means for guiding said steering rod for linear movement along its longitudinal line and rotary movement around its longitudinal line;
    joint means coupling a part of said swing shaft with said crank portion of said steering rod for transmitting a gyrating movement of said swing shaft around said longitudinal line of said coupling shaft to said steering rod as a longitudinal movement thereof; and
    control means for rotating said steering rod about its longitudinal line according to an output from a vehicle speed sensor.

2. A front and rear wheel steering system for a vehicle according to claim 1, wherein said joint means comprises a ball member received in a complementary spherical cavity provided in said crank portion, and a linear slide bearing provided coaxially in said ball member for guiding said swing shaft along its longitudinal direction.

3. A front and rear wheel steering system for a vehicle according to claim 1, wherein said joint means comprises an eccentric shaft extending from said swing shaft in parallel therewith, first guide means provided in said crank portion for guiding said swing shaft along a lateral direction in parallel with the longitudinal line of said steering rod, a slider member including a ball member received in a complementary spherical cavity provided in said slider member, and a linear slide bearing provided coaxially in said ball member for guiding said eccentric shaft along its longitudinal direction, second guide means provided in said crank portion for guiding said slider member along a direction perpendicular to said lateral guiding direction of said first guide means.

4. A front and rear wheel steering system for a vehicle according to claim 1, wherein said control means comprises hydraulic cylinder means for rotating said steering rod.

5. A front and rear wheel steering system for a vehicle according to claim 4, wherein said hydraulic cylinder means comprises a restoring spring for restoring said steering rod to a neutral position at which said swing shaft aligns with said coupling shaft.

6. A front and rear wheel steering system for a vehicle according to claim 1, wherein said control means can rotate said steering rod over a range which includes positions of said swing shaft diametrically opposed with respect to a position of said swing shaft aligned with said coupling shaft.

7. A front and rear wheel steering system for a vehicle, comprising: a front wheel steering gear box having an input end coupled with a steering wheel, a first output end coupled with a steering linkage for a front wheel, and a second output end coupled with an end of a coupling shaft extending longitudinally of a vehicle body for transmitting a steering input from said steering wheel as a rotary movement of said coupling shaft about its longitudinal line; and a rear wheel steering gear box having an input end coupled with another end of said coupling shaft, and an output end coupled with a steering linkage for a rear wheel; wherein said rear wheel steering gear box comprises:
    a swing shaft pivotally coupled with said other end of said coupling shaft at its one end via a pivot shaft extending perpendicularly to said longitudinal line of said coupling shaft;
    a steering member for steering said rear wheel by a lateral movement thereof;
    guide means for first guiding said steering member for a lateral movement and a vertical movement;
    an eccentric shaft extending from said swing shaft in parallel therewith;
    second guide means provided in said steering member for guiding said swing shaft along said lateral direction;
    a slider member;
    third guide means provided in said steering member for guiding said slider member along a vertical direction;
    joint means coupling a part of said eccentric shaft with said steering member for transmitting a gyrating movement of said swing shaft to said steering member as a lateral movement thereof; and control means for vertically displacing said steering member according to an output from a vehicle speed sensor.

8. A front and rear wheel steering system according to claim 7, wherein said joint means comprises a ball member received in a complementary spherical cavity provided in said slider member, and a linear slide bearing provided coaxially in said ball member for guiding said eccentric shaft along its longitudinal direction.

9. A front and rear wheel steering system for a vehicle, comprising:
   a front wheel steering gear box linked with a steering wheel;
   a rear wheel steering gear box including a rear wheel steering mechanism and means for modifying a steering angle ratio through a hydraulic circuit, said rear wheel steering mechanism being mechanically coupled with said front wheel steering gear box; and
   an electric circuit for monitoring a working condition of said modifying means and activating a fail safe mechanism which neutralizes operation of said modifying means depending on said working condition detected by said electric circuit.

10. A steering system according to claim 9, wherein said fail safe mechanism comprises a control component of said hydraulic circuit.

11. A front and rear wheel steering system according to claim 7, wherein said rear wheel steering gear box further comprises a steering rod extending laterally of the vehicle body, said steering member consists of a crank portion of said steering rod, and said first guide means comprises a journal bearing for rotatably supporting said steering rod around its longitudinal line.

12. A steering system according to claim 10, wherein said control component consists of an electrically controlled valve.

* * * * *

UNITED STATES PATENT AND TRADEMARK OFFICE
CERTIFICATE OF CORRECTION

PATENT NO. : 5,199,523
DATED : April 6, 1993
INVENTOR(S) : Abe et al.

It is certified that error appears in the above-identified patent and that said Letters Patent is hereby corrected as shown below:

Column 5, line 21, change "55,and" to --55, and--.

Column 8, line 35, change "angle." to --angle--.

Signed and Sealed this

Thirtieth Day of November, 1993

Attest:

BRUCE LEHMAN

Attesting Officer

Commissioner of Patents and Trademarks